United States Patent [19]

Hauser et al.

[11] 4,056,126
[45] Nov. 1, 1977

[54] SPOOL VALVE ARRANGEMENT

[75] Inventors: Manfred Hauser, Schwieberdingen; Werner Schumacher, Asperg, both of Germany

[73] Assignee: Robert Bosch GmbH, Stuttgart, Germany

[21] Appl. No.: 661,164

[22] Filed: Feb. 25, 1976

[30] Foreign Application Priority Data

Mar. 19, 1975  Germany ............................ 2511991

[51] Int. Cl.² ............................................ F15B 13/044
[52] U.S. Cl. ............................ 137/625.65; 137/625.69
[58] Field of Search ...................... 137/625.65, 625.69

[56] References Cited

U.S. PATENT DOCUMENTS

| | | | |
|---|---|---|---|
| 2,916,019 | 12/1959 | Murphy | 137/625.65 |
| 2,987,050 | 6/1961 | Oppenheimer et al. | 137/625.69 X |
| 3,060,970 | 10/1962 | Aslan | 137/625.65 X |
| 3,324,890 | 6/1967 | Whitmore et al. | 137/625.69 |
| 3,459,225 | 8/1969 | Smith | 137/625.65 |
| 3,552,442 | 1/1971 | Knowles | 137/625.69 |
| 3,608,586 | 9/1971 | Daggy | 137/625.65 |
| 3,812,883 | 5/1974 | Yokokawa | 137/625.69 |
| 3,896,856 | 7/1975 | Schumacher et al. | 137/625.65 |

FOREIGN PATENT DOCUMENTS

| | | | |
|---|---|---|---|
| 1,550,632 | 1/1970 | Germany | 137/625.65 |
| 1,550,633 | 9/1969 | Germany | 137/625.69 |

Primary Examiner—Alan Cohan
Assistant Examiner—Gerald A. Michalsky
Attorney, Agent, or Firm—Michael J. Striker

[57] ABSTRACT

A spool valve arrangement includes a housing having a flow-through passage formed with a fluid-admitting inlet and a pair of fluid-discharging outlets, and a pair of pressure-relief chambers each associated with a respective outlet for relieving pressure thereat. The arrangement further comprises a spool slide having respective ends each facing into one of the pressure-relief chambers and also has a pair of lands. The spool slide is mounted in the passage for movement from a neutral position in which the lands prevent communication between the inlet and the outlets and in which communication is also prevented between the latter and their associated chambers, towards operative positions in which pressure relief is permitted at a respective one of the outlets so that pressurized fluid escaping from one outlet into its associated chamber acts on the respective end of the slide which faces the latter and tends to accelerate the movement of the spool slide towards one of its operative positions. Attenuation elements, each formed with a deflecting surface positioned to be impinged by the pressurized fluid escaping into the respective pressure-relief chamber, dampens the acceleration of the spool slide and slows the movement of the latter towards the respective operative positions.

12 Claims, 2 Drawing Figures

SPOOL VALVE ARRANGEMENT

BACKGROUND OF THE INVENTION

The present invention relates generally to a spool valve arrangement and, more particularly, to a construction in which the switching operation of such a valve is accomplished smoothly and quietly.

It is known in the prior art to smooth the operation of a valve in a fluid system by damping the movement of the spool slide so as to prevent shockwaves from disturbing the effective running of the fluid system. A spring-loaded piston is slidingly received in a flowrestrictor sleeve mounted on the valve. As the piston moves in the sleeve, a different flow-through crosssection is presented to the fluid.

This prior-art arrangement is not only quite expensive, but has the added disadvantage that it is quite jerky and noisy in operation. As pressurized fluid escapes from an outlet towards its respectively associated return-flow or pressure-relief chamber, the pressurized fluid immediately acts upon an adjacent end of the spool slide and tends to accelerate the movement of the slide. Thus, the slide is very rapidly moved towards one of its operative positions, thereby causing undesirable impulses and shockwaves in the fluid system.

SUMMARY OF THE INVENTION

Accordingly, it is a general object of the present invention to overcome the disadvantages of the prior art.

An additional object of the present invention is to dampen the undesirable acceleration of the spool slides of the prior art.

Yet another object of the present invention is to prevent shockwaves from propagating through a fluid system.

An additional object of the present invention is to quiet the noise caused by too rapid movement of the spool slide.

Yet another object of the present invention is to provide an economical, efficient, reliable and easy-to-manufacture spool valve arrangement.

In keeping with these objects and others which will become apparent hereinafter, one feature of the invention resides, briefly stated, in a spool valve, comprising a housing having a flow-through passage formed with a fluid-admitting inlet and a pair of fluid-discharging outlets, and a pair of pressure-relief chambers each associated with a respective outlet for relieving pressure thereat. A spool slide having respective ends each facing into one of the pressure-relief chambers and also having a pair of lands is mounted in the passage for movement from a neutral position in which said lands prevent communication between said inlet and said outlets and in which communication is also prevented between the latter and their associated chambers, towards operative positions. Means for alternatively moving said spool slide from said neutral position towards one of said operative positions is provided so as to permit pressure relief at a respective one of said outlets so that pressurized fluid escaping from said one outlet into its associated pressure-relief chamber acts on the respective end of said slide which faces the latter and tends to accelerate the movement of said spool slide towards said one operative position. Means for damping the acceleration of said spool slide comprises attenuating elements, each formed with a deflecting surface positioned to be impinged by the pressurized fluid escaping into the respective pressure-relief chamber so as to slow the movement of said spool slide towards the respective operative positions.

The feature of positioning an attenuation element having a deflecting surface in the path of the pressurized fluid escaping from an outlet towards its respective pressure-relief chamber assures that the movement of the spool slide is slowed. In other words, undesirable shockwaves are substantially eliminated due to the attenuation of the very rapid acceleration of the slide.

In addition, the noise level of the valve is reduced. Instead of having the spool slide undesirably slam into its operative positions, the dampened movement of the slide substantially eliminates this drawback as well.

Turbulence in the fluid flow is, in turn, prevented by the shape of the attenuation element itself. If the element has a tapered deflecting surface, preferably a generally conically-configured surface, then the fluid flow is substantially directed towards a return-flow port in a non-turbulent manner.

In accordance with yet another feature of the invention, means for returning the spool slide from either of its operative positions towards its neutral position is constituted of biasing means or springs which urge respective abutment members against shoulders of the attenuation elements. The returning means is provided at the side of the attenuation element opposite to the side formed with the deflecting surface so that fluid can efficiently flow towards the latter without being obstructed or interrupted by the returning means.

Still another feature of the invention is to provide shoulders in the housing to engage the surface of the abutment members of the returning means. These shoulders permit a very long-lasting, reliable surface contact engagement which serves to center the lands of the spool slide in the neutral position of the valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
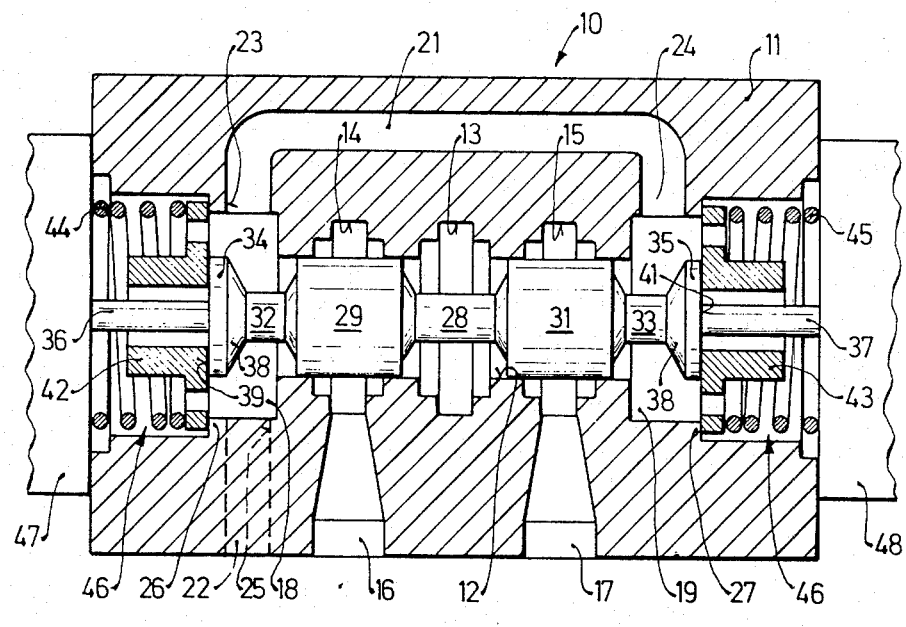
FIG. 1 is a partial view in vertical section of a spool valve in neutral position in accordance with the present invention.

Referring firstly to FIG. 1 of the drawing, reference numeral 10 generally identifies a spool valve which is comprised of a housing 11 which is provided with a flow-through passage or bore 12. Bore 12 has a plurality of enlarged sections spaced axially in direction along the elongation of the bore.

The central section of the bore 12 constitutes a fluid-admitting inlet 13 which is adapted to be connected to a non-illustrated reservoir of fluid. Flanking the inlet 13 on opposite sides thereof, a pair of fluid-discharging outlets 14 and 15 are provided which are respectively connected with the outlet ports 16 and 17.

A pair of return-flow or pressure-relief chambers 18 and 19 are provided on opposite lateral sides of the bore 12, each chamber being associated with a respective outlet 14, 15 for relieving pressure thereat, as will be explained in greater detail below. The chambers 18, 19 communicate with each other by means of a U-shaped passage 21 formed with mouths 23, 24 at its respective ends which open into the chambers 18, 19. A return-flow port 22 is formed in the housing 11 and communicates with the chamber 18 so as to complete the return path back to a non-illustrated reservoir. The mouth 25 of port 22, as well as the mouths 23 and 24 are all located as close as possible to the outlets 14 and 15.

A spool slide 28 having a pair of lands 29 and 31 is mounted for close sliding movement in the passage 12. As shown in FIG. 1, lands 29 and 31 are normally positioned in a neutral position in which the lands prevent communication between the inlet 13 and the outlets 14 and 15, and in which communication is also prevented between the outlets 14 and 15 and their respectively associated return-flow chambers 18 and 19.

The slide 28 is alternately moved to-and-fro from the illustrated neutral position of FIG. 1 towards operative positions in each of which communication is established between the inlet 13 and one of said outlets 14 or 15 and in which communication is established between the other of said outlets and its respective pressure-relief chamber. Many types of devices can be used to reciprocably move the slide; e.g., electromagnetic means 47, 48 comprising reciprocably-actuatable rods 36, 37 connected with slide 28 may be employed.

When pressure is relieved at an outlet as a result of communication being established thereat with its chamber, the pressurized fluid escaping from the outlet flows towards its associated chamber. During this flow, the pressurized fluid acts on the end of the slide 28 which faces into the chamber in question. The pressurized fluid thus tends to accelerate the movement of the slide 28 towards one of its operative positions.

In order to dampen or slow this undesirable accelerated movement of the slide 28, attenuation elements 34 and 35 are located at opposite ends of the slide 28 by means of the cylindrical members 32 and 33, respectively. Each attenuation element is formed with a deflecting surface 38 which is positioned to be impinged by the pressurized fluid escaping into the respective chamber. Preferably, each element 34 and 35 has a generally conically-configurated deflecting surface. Because of the presence of the deflecting surface in the path of the escaping pressurized fluid, each element serves to slow the movement of the slide 28 towards its respective operative positions.

Each land 29, 31 is cylindrical and has a cross-sectional area having a predetermined diameter. Each element 34, 35 is also formed with a cylindrical shoulder which has a cross-sectional area having a diameter approximately equal to said predetermined area so that each land and element is closely received in the passage 12. Cylindrical members 32 and 33 have a considerably smaller cross-sectional diameter.

Each shoulder of the elements 34, 35 has a bearing surface 39, 41 which respectively abuts against abutment members 42, 43 by means of biasing means or springs 44, 45. The springs and abutment members cooperate with the shoulders of the elements so as to constitute means 46 for returning the slide 29 from either of its operative positions towards the neutral position. Shoulders 26 and 27 are formed in the housing 11 so as to engage the abutment members 42, 43 and serve to center the lands 29 and 31 in the outlets 14 and 15.

Figure 2:
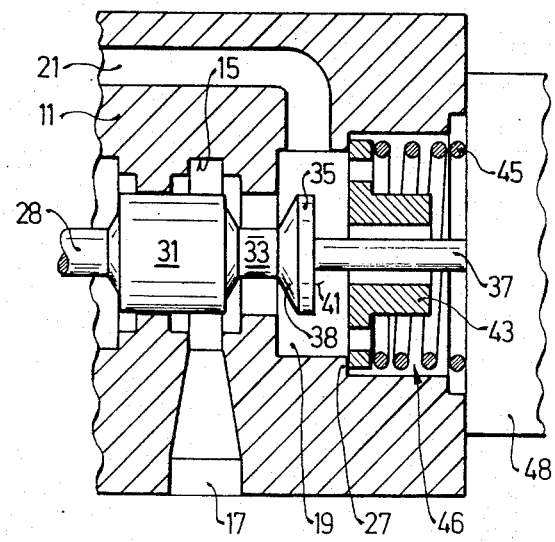
FIG. 2 is a partial view in vertical section of the right side of FIG. 1 in an operative position.

The operation of the spool valve will now be discussed with particular reference to FIG. 2 which shows one operative position in which the electromagnetic means 48 has moved the slide 28 towards the left. In this operative position, land 29 is moved so that communication is established between inlet 13 and outlet 14. Simultaneously, land 31 establishes communication between outlet 15 and its pressure-relief chamber 19.

If the pressure existing in outlet 15 builds up to a relatively high value before the slide 28 is moved, this pressure will be relieved as soon as the land 31 is displaced from the outlet 15. Then, the released high-pressure head acts substantially immediately only upon the right end of the slide which faces into the chamber 19. The pressure head does not immediately act on the left end of the slide, because the pressure is delayed due to the fact that the pressure must be propagated and traverse the additional distance of the U-shaped passage 21. As a result of this force imbalance, the slide 28 is accelerated towards the left.

In order to attenuate this undesirable acceleration, the deflecting surface 38 of element 35 is positioned to face the escaping pressurized medium. Thereby, a force is generated having a component acting generally in direction opposite to the direction in which the slide is being moved. The switching speed of the spool valve is thus substantially reduced, and the undesirable noise, vibration, fluid shockwaves and impulse forces caused by too rapid switching is also substantially reduced. The position of the attenuation element 35 with respect to the flow of the escaping pressurized medium and with respect to the chamber 19, the size of the attenuation element 35, and the shape of the deflecting surface of the attenuation element 35 are selected so that the switching speeds can be controlled over a major portion of the stroke of the slide 28.

In addition, by providing that the deflecting surface 38 is tapered and adjacent to the mouth 24, the escaping return flow is for the most part directed towards the mouth 24 and not in direction towards the abutment member 43. The flow is thus directed without substantial turbulence.

The attenuation elements 34, 35 are coaxially arranged with respect to the elongated slide 28 and therefore are easily and simply manufactured by turning techniques.

The above-described operation is completely analogous if the slide 28 were moved towards the right by the electromagnetic means 47; hence, a detailed description of this operative position is not believed to be necessary.

It will be understood that other changes may be incorporated into the invention without departing from the spirit thereof. Thus, the slide 28 can have a positive or negative overlap configuration. Of course, the deflecting surface need not be conically-configurated, as shown, but may have other configurations. The spool valve may have a different number of lands, inlets or outlets, resulting in one-position, two or more-position valve construction types. Instead of electromagnetically-actuated means, other mechanical, pneumatic or hydralic type actuators can be employed. Depending upon the application, a different attenuation is required for the valve. For example, it is not as necessary to overly dampen the switching operation in those applications where a certain minimal force is desired for high switching efficiencies.

It will be understood that each of the elements described above, or two or more together, may also find a useful application in other types of constructions differing from the types described above.

While the invention has been illustrated and described as embodied in a spool valve arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a valve, a combination comprising a housing having a flow-through passage formed with a fluid-admitting inlet and a pair of fluid-discharging outlets; a pair of pressure-relief chambers each associated with a respective outlet for relieving pressure thereat; a spool slide having respective ends each facing into one of said pressure-relief chambers and also having a pair of lands, said spool slide being mounted in said passage for movement from a neutral position in which said lands prevent communication between said inlet and said outlets and in which communication is also prevented between the latter and their associated chambers, towards operative positions; means for alternatively moving said spool slide from said neutral position towards one of said operative positions so as to permit pressure relief at a respective one of said outlets so that pressurized fluid escaping in a path from said one outlet towards its associated pressure-relief chamber acts on the respective end of said slide which faces the respective chamber and tends to accelerate the movement of said spool slide in a predetermined direction towards said one operative position; and means for counteracting the acceleration of said spool slide, comprising attenuating elements each formed with a deflecting surface extending transversely of said path so as to be directly impinged by the pressurized fluid escaping into the respective pressure-relief chamber in direction opposite to said predetermined direction, to thereby slow the movement of said spool slide towards its respective operative positions.

2. A valve as defined in claim 1, wherein each attenuating element is located on said spool slide at said respective ends thereof.

3. A valve as defined in claim 1, wherein said deflecting surface has a conical configuration.

4. A valve as defined in claim 1; and further comprising means for returning said spool slide from either of said operative positions towards said neutral position.

5. A valve as defined in claim 4, wherein said returning means comprises a pair of abutment members, and means for urging said abutment members against respective ones of said attenuating elements.

6. A valve as defined in claim 5, wherein said attenuating elements are further formed with a shoulder having a bearing surface against which said abutment members are respectively urged.

7. A valve as defined in claim 1, wherein said spool slide is elongated, and wherein said attenuating elements are coaxially and outwardly arranged with respect to said lands, and wherein said respective deflecting surfaces of said attenuating elements diverge away from each other in direction of the elongation of said spool slide.

8. A valve as defined in claim 1, wherein each land is cylindrical and has a predetermined cross-sectional area, and wherein each attenuating element is further formed with a cylindrical shoulder having a cross-sectional area approximately equal to said predetermined cross-sectional area.

9. A valve as defined in claim 8; and further comprising means for connecting each attenuating element to said respective lands, said connecting means comprising cylindrical members each having a cross-sectional area which is smaller than said predetermined cross-sectional area of said cylindrical shoulder.

10. A valve as defined in claim 1, wherein said means for moving said slide comprises electromagnetic actuating means which includes actuating pins connected with said respective ends of said spool slide.

11. A valve as defined in claim 1; and further comprising means for permitting communication between said chambers comprising a passage having respective ends formed with openings, each of which communicate with said respective chambers; and wherein said attenuating elements are located on said slide spool in the vicinity of said openings.

12. A valve as defined in claim 1, wherein said attenuating elements are mounted on said spool slide in said pressure-relief chambers.

* * * * *